United States Patent [19]

Tanimoto et al.

[11] 4,281,578
[45] Aug. 4, 1981

[54] CLEF AND SCALE INDICATOR FOR MUSIC INSTRUMENTS

[75] Inventors: Akira Tanimoto, Kashihara; Tomohiro Inoue, Nara, both of Japan

[73] Assignee: Sharp Kabushiki Kaisha, Osaka, Japan

[21] Appl. No.: 24,952

[22] Filed: Mar. 29, 1979

[30] Foreign Application Priority Data

Mar. 31, 1978 [JP] Japan .................................. 53-39064

[51] Int. Cl.³ .............................................. G09B 15/04
[52] U.S. Cl. ................................ 84/470 R; 84/471 R; 84/483 R
[58] Field of Search ............. 84/470 R, 471 R, 477 R, 84/478, 1.03, 481, 482, 483 R, 1.01, 484; 35/5, 6

[56] References Cited

U.S. PATENT DOCUMENTS

| 2,731,871 | 1/1956 | Loughrie | 84/470 |
| 3,256,765 | 6/1966 | Siegel | 84/470 |
| 3,623,393 | 11/1971 | Vollero | 84/470 |
| 4,098,165 | 7/1978 | Akiyama | 84/470 R |

Primary Examiner—L. T. Hix
Assistant Examiner—Stafford D. Schreyer
Attorney, Agent, or Firm—Birch, Stewart, Kolasch & Birch

[57] ABSTRACT

A programmable music instrument comprises an indicator for indicating a particular tone having a clef and a relevant scale on a screen, a liquid crystal display, and an electrochromic display cell or the like. A series of input keys is provided for providing digital information defining a musical note, the number of which corresponds to that of the notes in an octave. An octave changing member is employed for selecting a desired tone. The indicator is operated to indicate a selected stave for the particular tone. The octave changing member comprises a switch operated in a relationship with the screen. It may comprise a driver circuit for the liquid crystal display, the electrochromic display cell or the like.

6 Claims, 14 Drawing Figures

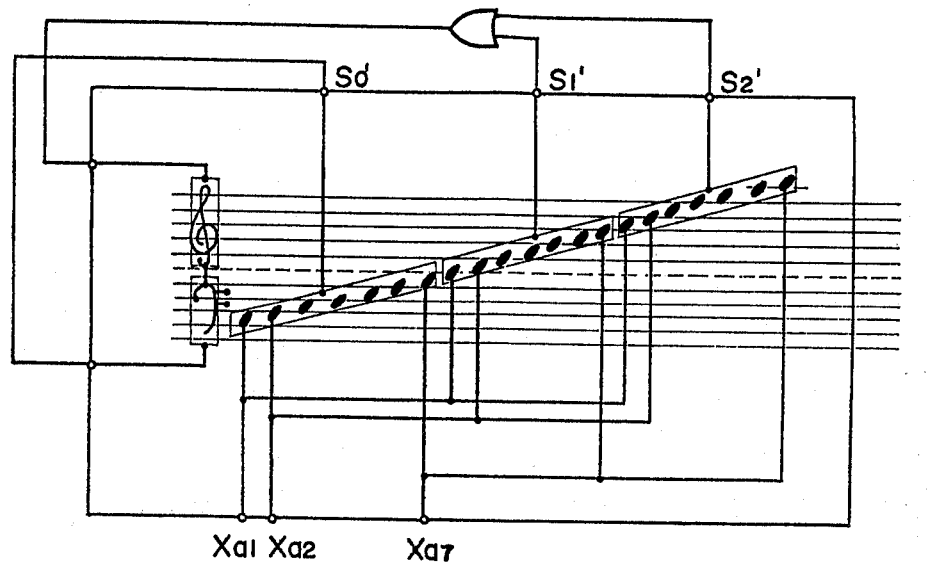
FIG.10
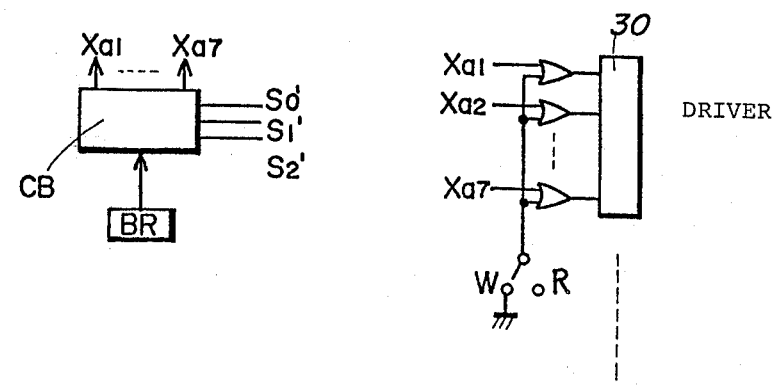
FIG.11
FIG.12

CLEF AND SCALE INDICATOR FOR MUSIC INSTRUMENTS

BACKGROUND OF THE INVENTION

The present invention relates to an electronic musical instruments and, more particularly, to an indicator for indicating a particular clef and relevant musical scales where an electronic musical instrument is being operated.

The present invention is directed to improvements to a conventional electronic musical instrument. For example, a copending U.S. Patent application Ser. No. 881,437, filed Feb. 28, 1978, in the name of Akira Tanimoto and entitled "ELECTRONIC MUSICAL INSTRUMENT WITH MUSICAL INFORMATION INPUT MEANS", assigned in common with the present application was disclosed the conventional electronic musical instrument.

In the electronic musical instruments disclosed in the above mentioned U.S. Patent application Ser. No. 881,437, specific musical information was introduced according to a combination of actuated keys. That is, there were provided a first group of keys for introducing musical information as to the tones of musical notes and a second group of keys for introducing musical information as the pitches of the musical notes.

Such an electronic musical instrument, however, had a problem in that an operator had to continuously keep in mind which key has been actuated in order to introduce musical information as to sound levels of a particular clef. This resulted in wasted time during the entry of inputs.

OBJECTS AND SUMMARY OF THE INVENTION

Accordingly, it is the primary object of the invention to provide a novel indicator for indicating pitches of musical notes in a specific clef at which an electronic musical instrument is being operated.

It is a further object of the invention to provide an improved electronic musical instrument having an indicator for indicating a particular clef and relevant scale.

It is a further object of the invention to provide an improved electronic musical instrument for selecting pitches of musical notes in the unit of one octave so that a series of keys corresponding to one octave are employed to provide musical information for various different octaves.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electronic musical instrument comprises an indicator for indicating on a visual screen means the clefs and scales of which are to be selectively introduced by input keys. The screen means comprises a screen, a liquid crystal display, an electrochromic display cell, or the like. Octave selection means is provided for changing the visibility of the screen so that a desirable display for a particular clef and scale of a specific tone is selected. The input keys are provided with a number corresponding to that of the tone in the scale, namely, each of 7 tones.

On the screen, there are printed staves each consisting of a particular clef and the scale such as the tones C, G, F or the like. A particular portion of the screen for the selected tone is made visual by driving the screen in response to a selected position of the octave selection means. In a liquid crystal display and an electrochromic display, respective clef and scale displaying segments are formed as electrodes. The electrodes of the selected clef and the scale position are enabled according to drivers controlled by the octave selection means.

A sound generation circuit operatively associated with the indicator includes an encoder circuit responsive to actuations of the input keys and the octave selection means for developing music information used to identify the introduced pitches of the notes in the selected octave. The music information from the encoder is stored in a memory used to perform a series of music programs. A memory output controller is provided for subsequently receiving the music information from the memory to generate sound corresponding to the music information.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 10 is a plane view of still another indicator according to the present invention;

FIG. 11 is a block diagram of a memory control circuit employed for the sound generation circuit adapted for use with the other indicator shown in FIG. 10;

FIG. 12 is a block diagram of another driver provided for the indicator shown in FIG. 10.

DESCRIPTION OF THE INVENTION

Figure 1:
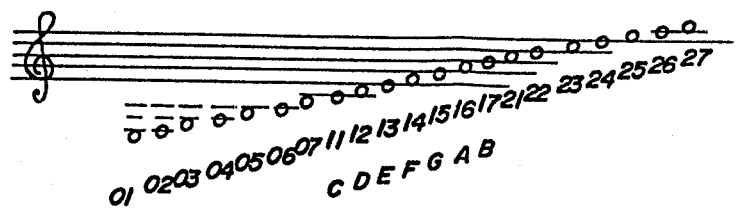
FIG. 1 is an octave diagram employed for an indicator of the present invention.

FIG. 1 shows an octave diagram employed for an indicator of the present invention. The octave diagram can be programmed according to the actuation of keys included within an electronic musical instrument such as disclosed in U.S. Pat. application Ser. No. 881,437, filed Feb. 28, 1978.

The octave and pitch of a musical note can be identified by a combination of keys. The octave of the note can be selected by a higher rank unit within codes "01" to "27" which correspond to the respective notes and are labeled below the same. The pitch of the note in the selected octave can be determined by a lower rank unit within those notes.

The seven notes included within the same octave are a particularly concern of the present invention and the relevant keys are identified as the keys "A" to "G", respectively, hereinbelow for convenience. These keys "A" to "G" are operated to define only the pitches regardless of the tones.

Figure 2:
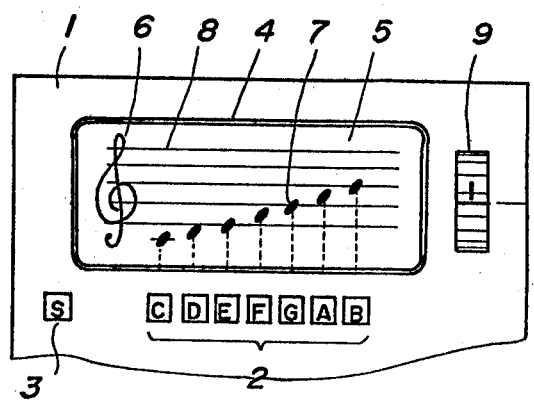
FIG. 2 is a plane view of an indicator according to the present invention.

FIG. 2 illustrates an indicator according to the present invention for indicating the octave and scale of music information introduced. In FIG. 2, there is provided within an electronic musical instrument denoted as 1, a series of pitch keys 2, a start key 3, a window 4 adjacent to the keys 2, a screen 5, a clef 6, notes 7, a stave or, groups of five horizontal lines 8 and a rolling knob 9.

The pitch keys 2 are used to introduce only pitch information. The start key 3 is actuated to provide sound from the musical instrument 1. The window 4 is transparent to make the screen 5 visible. The clef 6, the notes 7 and the stave 8 are previously printed on the screen 5 to provide the indication of the octave and the relevant scale. The rolling knob 9 is driven to move the screen 5, which has three stable points identified by the mark of "0", "1" and "2" described below.

Figure 3:
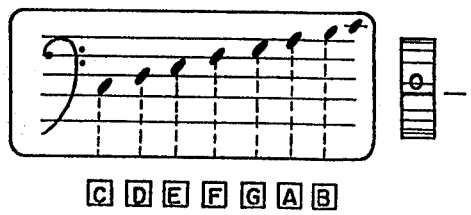
FIGS. 3 and 4 are plane views of the visual indication effected by the indicator shown in FIG. 2.
Figure 4:
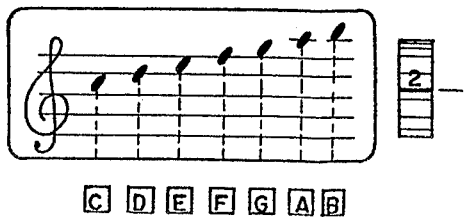

FIGS. 3 and 4 are plane views of the indicator showing the indications referred to the marks "0"0 and "2" of the rolling knob 9, respectively.

With reference to FIGS. 2 to 4, the indications by the screen 5 are changed as follows: When pitch "C" in a tone "C" is about to be introduced as shown in FIG. 2, the rolling knob 9 is fixed in the position of the mark "1" and then the pitch key "C" is actuated. If and when the pitch "C" in another tone F is being applied, the rolling knob 9 is fixed in the position of the mark "0" and the pitch key "C" is then actuated. The screen 5 is then selected so that the staves of an F tone are visible as shown in FIG. 3. Similarly, the staves of a G tone become visible as shown in FIG. 4 by setting the rolling knob 9 to the mark "2". The indications of the tones with the aid of the screen 5 are useful for introducing the respective tone information.

Figure 5:
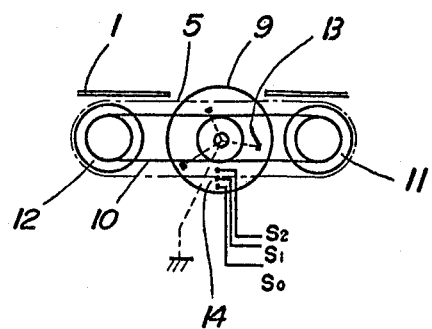
FIG. 5 is a side view of a mechanism for moving a screen employed within the indicator shown in FIG. 2.

FIG. 5 indicates a screen drive assembly for moving the screen 5. The assembly comprises the rolling knob 9, a belt 10, two shafts 11 and 12, and terminals 13 and 14. The two shafts 11 and 12 are formed in such a manner as to tighten the screen 5 therebetween.

The rolling knob 9 is rotated to drive the belt 10 in unison. The shafts 11 and 12 are rotated by the belt 10 so that the screen 5 is moved. Each of the three terminals 13 is secured on the rolling knob 9 at each of the three stable points therein. Other three terminals 14 are provided for connecting with the respective three terminals 13 to identify the position of the rolling knob 9. The three terminals 13 are biased at ground potential.

If and when any of the three terminals 13 is connected to any of the three terminals 14 related to lines $S_0$–$S_2$, the line connected to one of the three terminals 13 is held at ground potential. The screen driver assembly is constructed so that the screen 5 is driven to indicate the staves of the F tone.

If another line S1 is connected and at ground potential, the screen 5 is driven to show the staves of the C tone. Similarly, the staves of the G tone are viewed on the screen 5 by the connection of still another line defined as S2.

Figure 6:
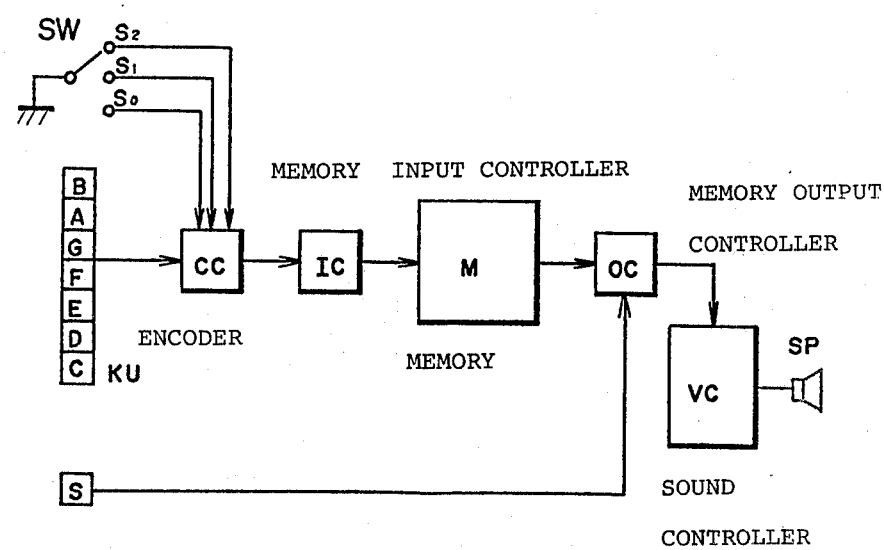
FIG. 6 is a block diagram of a sound generation circuit adapted to the indicator shown in FIG. 2.

FIG. 6 illustrates a sound generation circuit related to the pitch keys 2 and the terminals 14. The sound generation circuit comprises a key unit KU, a memory M, an encoder CC, a memory output controller OC, a memory input controller IC, a sound controller VC, a speaker SP and a switch SW.

The sound generation circuit shown in FIG. 6 is similar to that disclosed in Kapps, U.S. Pat. No. 3,878,750, issued Apr. 22, 1975, with the exception that the octave selection means are incorporated according to the present invention and the patent is concerned with a musical synthesizer.

The switch SW is related to the terminals 14 shown in FIG. 5. The memory M is wired to contain and store sound information in the form of digital codes in such a manner as a musical program. The key unit KU is related to the pitch keys 2 shown in FIG. 2. The encoder CC is used to detect which of the pitch keys 2 is actuated and provide binary codes corresponding to the operated pitch keys 2. The output of the encoder CC is summarized in Table I in the form of digital codes, which is used to identify the pitches of the notes. The output of the encoder CC is of three octaves and determined by the selection of the pitch keys 2, namely, "A" to "G" and the signals S0 to S2.

TABLE 1

|   | $S_0$ | $S_1$ | $S_2$ |
|---|---|---|---|
| B | $x_{21}$ | $x_{14}$ | $x_7$ |
| A | $x_{20}$ | $x_{13}$ | $x_6$ |
| G | $x_{19}$ | $x_{12}$ | $x_5$ |
| F | $x_{18}$ | $x_{11}$ | $x_4$ |
| E | $x_{17}$ | $x_{10}$ | $x_3$ |
| D | $x_{16}$ | $x_9$ | $x_2$ |
| C | $x_{15}$ | $x_8$ | $x_1$ |

With reference to Table 1, when the pitch key "C" is actuated under the condition that the line S0 is at ground potential, the code identified as X15 is generated. On the other hand, the code denoted as X8 is delivered by the actuation of the pitch key "C" while the line S1 is at ground potential.

Turning back to the circuit configuration of FIG. 6, the memory input controller IC is interposed between the encoder CC and the memory to sequentially introduce the output of the encoder CC into the memory M. The memory output controller OC is responsive to the start key S for allowing the memory M to subsequently deliver the output. The sound controller VC is responsive to the memory output controller OC for providing specific sound information to drive the speaker SP.

In accordance with another specific form of the present invention, the indicator comprises a liquid crystal to show which of the notes in a particular tone is being performed.

Figure 7:
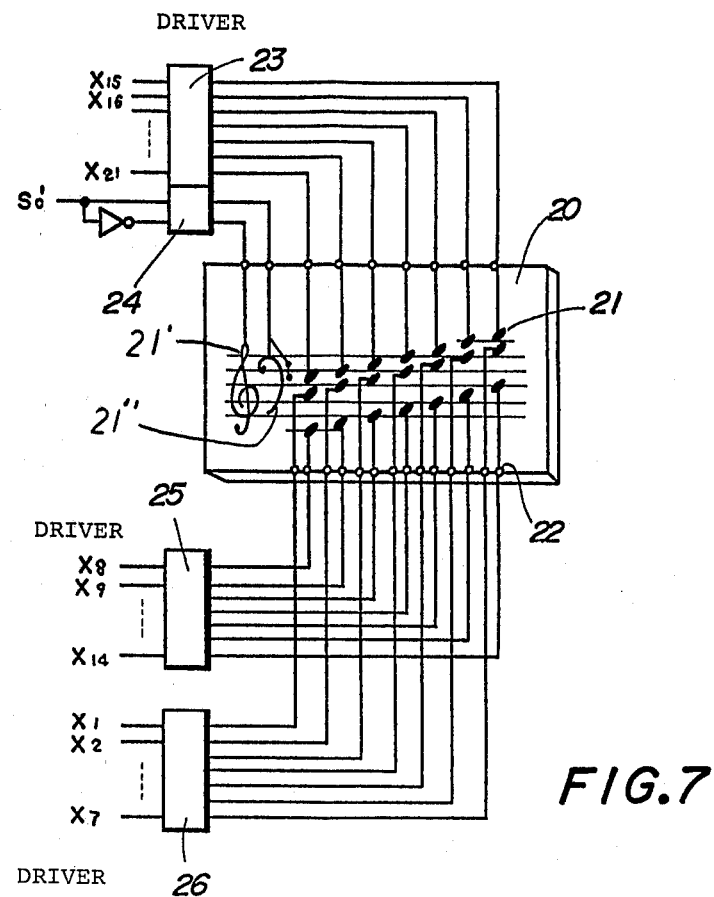
FIG. 7 is a plane view of another indicator according to the present invention.

FIG. 7 illustrates another indicator of the present invention where there are provided a liquid crystal display 20, note electrodes 21, clef electrodes 21', terminals 22, and drivers 23 to 26.

As the structure of the liquid crystal display 20 is well known to those skilled in the art, the detailed description is omitted herein. The note electrodes 21 have the shape of the notes the number of which corresponds to the notes for the tones played in the musical instrument. The clef electrodes 21' and 21" are shaped as the cleves for the respective tones played in the musical instrument. The staves are printed in black on a reflective plate for the liquid crystal display. The terminals 22 are provided for transferring input/output signals from the drivers 23 to 26 to the liquid crystal display 20. A switch relevant to the switch SW shown in FIG. 6 is provided although not shown.

Figure 8:
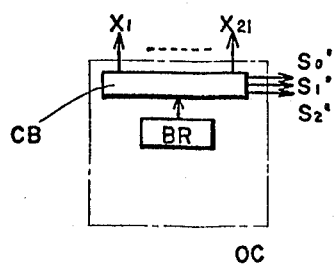
FIG. 8 is a block diagram of a memory control circuit employed for the sound generation circuit adapted to the other indicator shown in FIG. 7.

FIG. 8 illustrates the circuit construction of the memory output controller OC of FIG. 6 to comply with the indicator as shown in FIG. 7.

The memory output controller OC of FIG. 8 comprises an output buffer circuit BR and a decoder circuit CB. The output buffer circuit BR is provided for containing note information. The decoder circuit BC is employed for deciphering the codes S1 to X21 summarized in Table I and the signals S0 to S2. Output signals S1 to S21 are developed from the decoder circuit CB to identify the codes X1 to X21.

Output signals S0', S1' and S2' are generated from the decoder circuit CB by deciphering the signals S0 to S2. The output signals S0', S1' and S2' are used to enable either the clef electrodes 21' or 21''. The presence of the output signal S0' indicates the F clef in the clef electrode 21'' while the absence of the output signal S0', namely, the presence of the remaining output signals S1' and S2', indicates the G clef in the clef electrode 21'.

Figure 13:
FIGS. 13 and 14 are respective octave display for use of the present invention.

Assuming that the code corresponding to the pitch key "C" in the selected tone C is introduced into the output buffer circuit BR, the decoder circuit CB delivers the output signals X8 and S1'. The output signal X8 is used to select and enable a relevant note electrode 21. The other output signal S1' is used to enable the G clef in the clef electrode 21'. Therefore, the following display is enabled in the indicator as shown in FIG. 13.

Figure 14:
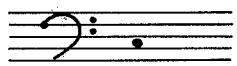

Further assuming that the code corresponding to the pitch key "C" in the selected tone G is applied to the output buffer circuit BR, the following display is similarly enabled in the indicator as shown in FIG. 14.

Figure 9:
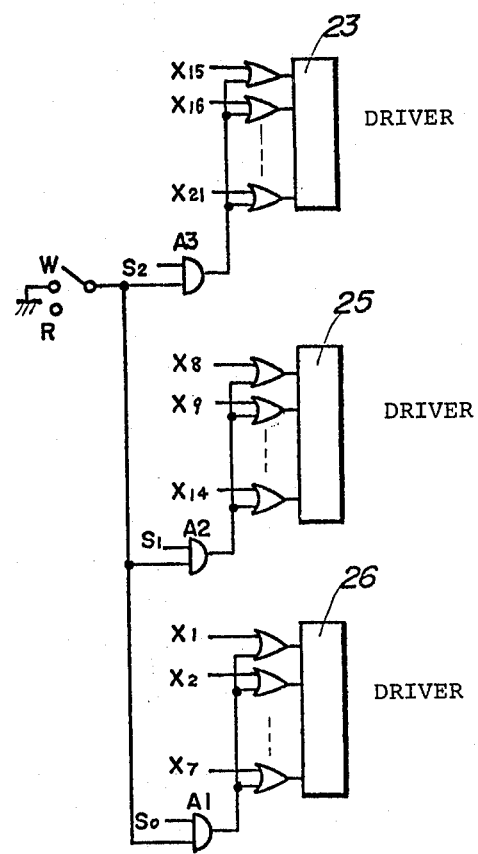
FIG. 9 is a block diagram of a driver provided for the other indicator shown in FIG. 7.

According to a further aspect of the present invention, all the notes contained within a particular scale are at once indicated in the indicator as viewed in FIGS. 2 to 4. To this end, a further driver circuit shown in FIG. 9 is provided which comprises three AND gates A1, A2, and A3 and the drivers 23, 25, and 26.

A switch is provided for controlling writing/reading operations for the musical information and for providing control signals on the basis of the situation. The AND gates A1 to A3 have the respective output signals S0, S1, and S2 and the control signals. A plurality of OR gates are interposed between the respective AND gates and the drivers. The OR gates receive output signals from the respective AND gates and the output signals X1 to X21.

When the musical information is introduced into the musical instrument, the switch is connected to the terminal "W" to thereby provide the control signals. One of the AND gates A1 to A3 becomes conductive with the aid of the generation of one of the output signals S0 to S2 according to the selection of a particular octave. This results in indicating all the notes contained within the particular octave at one.

The start key 3 may be provided for determining in the writing operation mode whether the introduced music program has been accurately and actually stored. If the start key 3 is energized in the writing operation mode, the introduced music program is sequentially applied to the output buffer circuit BR by one step of the music program each time the start key 3 is energized. The music program containing a variety of the notes is displayed on the indicator as previously mentioned. The output controller OC is constructed so that the music program is automatically performed in all the steps in response to the actuation of the start key 3 in the reading operation mode.

FIG. 10 is a still another indicator of the present invention where all the notes in the whole tones are in line arranged. A relationship between the sequent electrodes and the back plate electrodes is illustrated in the liquid crystal display of FIG. 10. The respective back plate electrodes are adapted to a particular octave. Therefore, the input/output terminals for the liquid crystal display are minimized. The codes are defined in Table 2 to identify the respective octaves as follows:

TABLE 2

|   | $S_0'$ | $S_1'$ | $S_2'$ |   |
| --- | --- | --- | --- | --- |
| B | $x_{07}$ | $x_{17}$ | $x_{27}$ | $x_{a7}$ |
| A | $x_{06}$ | $x_{16}$ | $x_{26}$ | $x_{a6}$ |
| G | $x_{05}$ | $x_{15}$ | $x_{25}$ | $x_{a5}$ |
| F | $x_{04}$ | $x_{14}$ | $x_{24}$ | $x_{a4}$ |
| E | $x_{03}$ | $x_{13}$ | $x_{23}$ | $x_{a3}$ |
| D | $x_{02}$ | $x_{12}$ | $x_{22}$ | $x_{a2}$ |
| C | $x_{01}$ | $x_{11}$ | $x_{21}$ | $x_{a1}$ |

For this specific form of the present invention, the memory output controller OC is composed as shown in FIG. 11 where octave signals S0', S1' and S2' and pitch signals Xa1 to Xa7 are generated from the decoder circuit CB according to the note information delivered from the output buffer circuit BR.

FIG. 12 illustrates a still another driver circuit for indicating the notes in the writing/reading operation modes. In the writing operation mode, all the notes corresponding to the pitches in the particular octave are displayed. In the reading operation mode, on the other hand, the note only related to the generated music information is indicated. The driver is identified as 30.

The above-mentioned liquid crystal display may be replaced by an electrochromic display cell such as disclosed in Deb, U.S. Pat. No. 3,829,196, issued Aug. 13, 1974.

While only certain embodiments of the present invention have been described, it will be apparent to those skilled in the art that various changes and modifications may be made therein without departing from the spirit and scope of the invention as claimed.

What is claimed is:

1. A system for providing musical note information to a musical instrument comprising:
   input key means for providing information representative of any desired note within an octave;
   an endless belt having musical staves and notes imprinted thereon, said endless belt being shiftable to produce a display of the musical notes of a desired octave;
   octave shift switch means for providing desired octave information corresponding to the octave displayed by said endless belt; and
   encoder means for combining said desired octave information with said information representative of any desired note within an octave to produce a desired note information signal;
   said desired note information signals produced by said encoder being utilized by said musical instrument to create audible tones associated with said desired note information signals.

2. The system of claim 1 further comprising octave selection means for shifting said endless belt to said desired display.

3. The system of claim 2 wherein said endless belt is disposed on a pair of parallel shafts.

4. A system for providing musical note information to a musical instrument comprising:

input key means for providing information representative of any desired note within an octave;

indicating means for displaying a musical clef, musical staves and notes of a particular octave, said indicating means being changeable to produce a display of the musical notes of a desired octave;

octave shift switch means for providing desired octave information corresponding to the octave displayed by said indicating means; and encoder means for combining said desired octave information with said information representative of any desired note within an octave to produce a desired note information signal;

said desired note information signals produced by said encoder being utilized by said musical instrument to create audible tones associated with said desired note information systems.

5. The system of claim 4, wherein the indicating means comprises a liquid crystal display or an electrochromic display where said clef and the relevant notes are formed as electrodes.

6. The system of claim 5 further comprising:

a drive circuit for driving said indicating means;

a signal generator for creating a frequency corresponding to each of said desired note information signals; and a transducer for producing said audible tones associated with said desired notes.

* * * * *